United States Patent [19]

Ghorashi et al.

[11] Patent Number: 5,674,612

[45] Date of Patent: Oct. 7, 1997

[54] POLY(P-PHENYLENE TEREPHTHALAMIDE) ARTICLES OF HIGH FLAME STRENGTH

[75] Inventors: Hamid Moayed Ghorashi, Midlothian, Va.; Robert Valentine Kasowski, West Chester, Pa.

[73] Assignee: E. I. Du Pont de Nemours and Company, Wilmington, Del.

[21] Appl. No.: 757,649

[22] Filed: Nov. 22, 1996

Related U.S. Application Data

[63] Continuation of Ser. No. 437,201, May 8, 1995, abandoned.

[51] Int. Cl.$^6$ .................... C08F 283/04; C08G 69/42
[52] U.S. Cl. ................... 428/357; 428/381; 428/395; 428/411.1; 428/474.4
[58] Field of Search ..................... 428/357, 364, 428/375, 376, 379, 381, 392, 395, 396, 411.1, 474.4

[56] References Cited

U.S. PATENT DOCUMENTS

| | | | |
|---|---|---|---|
| 4,112,016 | 9/1978 | Moulds | 428/35.1 |
| 4,198,494 | 4/1980 | Burckel | 428/359 |
| 4,741,740 | 5/1988 | Davis et al. | 8/490 |
| 5,319,013 | 6/1994 | Kasowski et al. | 428/359 |
| 5,336,734 | 8/1994 | Bowen et al. | 428/337 |
| 5,356,666 | 10/1994 | Jackson et al. | 427/331 |

OTHER PUBLICATIONS

Clark, "Flame Resistant Fibers" (1974), (Abstract Only) CA#84:107036.

Pleskun, "Flame Resistant Textiles W/Molybdenum & Tungsten", (1973), (Abstract Only), CA#79:6713.

*Primary Examiner*—Cecilia J. Tsang
*Assistant Examiner*—Patrick R. Delaney

[57] ABSTRACT

Articles made from poly(p-phenylene terephthalamide) polymer having an inherent viscosity of 1.5 to 4 dL/g, 5 to 20 mols of sulfur, as sulfonate, per 100 mols of polymer repeat units, and at least 0.5 weight percent of tungsten oxides or molybdenum oxides; and the process for making such articles.

6 Claims, No Drawings

POLY(P-PHENYLENE TEREPHTHALAMIDE) ARTICLES OF HIGH FLAME STRENGTH

This is a continuation of application Ser. No. 08/437,201 filed May 8, 1995, now abandoned.

BACKGROUND OF THE INVENTION

1. Field of the Invention

This invention relates to articles of poly(p-phenylene terephthalamide) which exhibit increased flame strength.

2. Description of the Prior Art

U.S. Pat. No. 4,112,016, filed Apr. 3, 1975, discloses polyamide fibers having improved fire protective qualities wherein the fibers, such as poly(p-phenylene terephthalamide), are grafted with certain phosphorus compounds.

U.S. Pat. No. 4,198,494, filed Sep. 30, 1974, discloses a blend of poly(p-phenylene terephthalamide) and poly(m-isophthalamide) which exhibit improved resistance against heat flux.

U.S. Pat. No. 4,741,740, filed Sep. 9, 1986, discloses increasing the flame resistance of aramid fibers by introducing organic fire retardant compounds into the fibers by means of organic fiber-swelling liquids.

SUMMARY OF THE INVENTION

The present invention provides a high flame strength article of poly(p-phenylene terephthalamide) having an inherent viscosity of from about 1.5 to 4 dL/g and from 5 to 20 mols of sulfur, as sulfonate groups, per 100 mols of polymer repeat units, with from 0.5–15 weight percent, based on total weight of the article, of a metal, wherein the metal is present as oxides, selected from the group consisting of tungsten oxides and molybdenum oxides, uniformly distributed throughout the article, said article exhibiting a flame strength of at least five times greater than the flame strength of the same article without the metal compound.

The present invention also provides a process for making high flame strength articles of poly(p-phenylene terephthalamide) comprising the steps of contacting a never-dried article of poly(p-phenylene terephthalamide) with an aqueous solution of metal ions selected from the group consisting of tungsten ions and molybdenum ions to introduce an amount of the metal into the article sufficient to increase the flame strength of the article, and drying the article.

DETAILED DESCRIPTION OF THE INVENTION

Articles made from poly(p-phenylene terephthalamide) (PPD-T) are well known for their extremely high strength and high modulus. For some end-use applications, however, there is a need for strength sustained through flaming conditions. "Articles", as used herein, refers to fibers, fabrics, films, ribbons, tapes, and the like, all exhibiting the characteristics and qualities of this invention. "Articles", herein, most often means fibers, fabrics, and films; and when mention is made herein of fibers, fabrics, or films, those terms include articles, generally.

Although PPD-T fibers are inherently flame resistant, it is often desirable to have PPD-T articles which maintain strength in the presence of a flame, thus providing a greatly improved flame barrier. A protective garment made from the fibers of this invention will exhibit an improved physical integrity in flame.

It has now been discovered that fibers made using sulfonated PPD-T having an inherent viscosity of from about 1.5 to 4 dL/g, and containing from 5 to 20 mols of sulfur, as sulfonate groups, per 100 mols of p-phenylene terephthalamide units (the repeat units of the polymer chain) possess the desired high flame strength when PPD-T of the article has a particular metal compound distributed throughout. In fact, the flame strength of the PPD-T articles of this invention is increased by at least five times over the flame strength of the same articles without the presence of the metal compound.

By PPD-T is meant the homopolymer poly(p-phenylene terephthalamide). PPD-T is most often prepared by polymerization of p-phenylene diamine and terephthaloyl chloride and, also, copolymers resulting from incorporation of small amounts of other diamines with the p-phenylene diamine or of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, provided only that the other diamines and diacid chlorides have no reactive groups which interfere with the polymerization reaction. Preparation of PPD-T is described in U.S. Pat. Nos. 3,869,429; 4,308,374; and 4,698,414.

In a convenient way to make fibers for the practice of this invention, high inherent viscosity (greater than about 5) PPD-T is mixed with sulfuric acid of a concentration of 100.2 to 102% to cause the desired degree of sulfonation of the PPD-T molecules. Conditions are carefully controlled such that the PPD-T molecular weight is reduced to an inherent viscosity (IV) level of from about 1.5 up to 4 dL/g (as measured on yarn spun from the PPD-T) while, at the same time, achieving the desired degree of sulfonation.

The degree of sulfonation and the degree of degradation of the PPD-T form a balance which is controlled by the sulfuric acid concentration, the polymer concentration in the sulfuric acid, the time of exposure of polymer to the acid, and the temperature of the sulfuric acid during exposure.

It has been found useful to employ sulfuric acid of concentration between about 100.2% and 102% to dissolve the PPD-T and sulfonate it. Acid concentrations above about 103% may cause unacceptably severe polymer degradation; and concentrations below about 100.2% may require unacceptably long times to achieve the desired degree of sulfonation.

The time and temperature at which the polymer is exposed to the acid will affect the degree of sulfonation and the degree of polymer degradation. Temperatures in the range of 75° to 120° C. and time periods of from 10 min. to 2 hours have been found useful.

The inherent viscosity, which is determined as described below, is a measure of the molecular weight of the polymer and serves as an indication of the reduction in molecular weight which the polymer has undergone in the sulfonation process.

In preparation of fibers of this invention, a spinning solution is conveniently made by dissolving the PPD-T at the desired concentration in concentrated sulfuric acid. The concentration of polymer in the acid is generally about 9 to 15 wt. %, and preferably about 12 wt. %; and the concentration of the acid is about 100 to 102%.

The sulfonation conditions employed in the present invention result in sulfur levels of 5 to 20 mols of sulfur, as sulfonate groups, per 100 mols of polymer repeat units. Below 5 moles the fibers seem incapable of imbibing significant amounts of the metal and above 20 mols, the polymer invariably shows an unacceptably low molecular weight.

Fibers of the present invention can be spun using the air-gap spinning conditions of U.S. Pat. No. 3,767,756 or the wet-spinning conditions of U.S. Pat. No. 3,671,542. If desired, the fibers of this invention can be produced in colors by incorporating pigments or other colorants in the spin solution. The sulfonated PPD-T solution can be extruded through spinnerets with orifices ranging from about 0.025 to 0.25 mm in diameter. The number, size, shape, and configuration of the orifices can be varied to achieve the desired fiber product. The extruded dope is fed into a coagulation bath with or without prior passage through a noncoagulating fluid layer. The noncoagulating fluid layer, if used, is generally air; but can be any other inert gas or liquid which is a noncoagulant for the dope. The noncoagulating fluid layer is generally from 0.1 to 10 centimeters in thickness.

The coagulating bath is aqueous and may contain as much as 80% sulfuric acid. The bath temperature can be as low as −10° C.; but can range from about 25°to 80° C. or slightly higher.

After the extruded dope has been conducted through the coagulating bath and the dope has coagulated into acid/water-swollen fibers, the fibers are thoroughly washed to extract the acid and neutralize acid groups. The fiber-washing solution can be water, followed by alkaline water.

After spinning fibers from the sulfonated, low inherent viscosity, PPD-T, those fibers, in "never-dried" form, are contacted with an aqueous solution of a metal compound to imbibe the metal and, by the presence of that metal, increase the flame strength of the articles. Several metals have been found to increase the flame strength of fibers using the process of this invention; but molybdenum and tungsten have been found to yield truly outstanding improvement. Other metals tested and found to yield some degree of improvement in flame strength include palladium, vanadium, and zirconium.

Contact of the article with the aqueous metal cation solution can be accomplished after the coagulating step in the spinning process or the aqueous metal compound solution can be used directly as a fiber coagulating liquid in the spinning process.

Any molybdenum or tungsten compound which can form a stable aqueous solution can be used herein. Compounds which assist in dissolving the metal compounds can also be added to the aqueous solution. Useful tungsten compounds include tungsten tetrachloride (with citric acid to stabilize the solution), heteropolytungstates such a phosphotungstic acids, homopolytungstates such as ammonium tungstate and sodium tungstate. Any tungsten compound can be used so long as it is soluble in water, and does not precipitate during conduct of the process. Preferred tungsten compounds are phosphotungstic acids and ammonium metatungstate. Preferred molybdenum compounds are phosphomolybdic acids.

The concentration of the metal in aqueous solution, the temperature of the solution, and the duration of the contact between the solution and the never-dried fiber are not critical provided an effective amount of metal is imbibed into the fiber structure. Concentrations (measured as elemental metal) of greater than about 1 weight percent or more, up to saturation in aqueous solution, are preferred. The temperature at which this contacting step is performed can be anything within the range at which the solution is liquid— 25° C. to 100° C. is preferred. The duration of contact can be from one or two seconds to an hour;—larger fibers requiring more time. All of the above variables can be adjusted such that the final concentration in the article (measured as elemental metal) is from 0.5–15 weight percent based on the finished article;—at least 1.0 weight percent being preferred.

By "never-dried" is meant that the fiber has been formed from an aqueous system and coagulated in an aqueous system and the water has not been removed from the fiber to less than about 100 weight percent. Never-dried fibers have an open, sponge-like, molecular structure which typically holds 100 to 300 or more weight percent water based on the weight of the dried polymer. When fibers are dried to less than about 20 weight percent water, the molecular structure collapses irreversibly and the process of this invention can no longer be performed thereon.

It is believed that the use of PPD-T which is, both, sulfonated and of low inherent viscosity, results in a material which is surprisingly high in attraction to certain metals and, in combination with such metals, exhibits surprising increase in flame strength. Tungsten and molybdenum solutions are taken more easily into aramid structures when the structures are never-dried and the aramid is of low inherent viscosity; and the metals taken into the never-dried aramid structures are believed to be held more effectively if the aramid is sulfonated and of low inherent viscosity.

The wet and swollen fibers, containing metal in solution, are next conducted to a drying step, as desired for developing final fiber qualities. The metal, which is present in the aramid fibers during the drying step, remains in the fibers after the drying step in the form of oxides. No special conditions are required for drying the fibers. Any reasonable temperature can be used with some care being exercised to avoid damaging the fibers by excess heat. It is preferred to dry the fibers in a vacuum on heated rolls or in an atmosphere of moving inert gas, although such is not required; and air is usually used as an atmosphere.

The sulfonated, low inherent viscosity, metal-oxide-containing, PPD-T fibers of this invention exhibit improved flame strength and are especially useful in fabrics for fire protective garments and like because of their maintained strength in flame.

Test Methods

Inherent Viscosity (IV) is defined by the equation:

$$IV=\ln(\eta_{rel})/c$$

where c is the concentration (0.5 gram of polymer in 100 ml of solvent) of a solution of the polymer being tested and $\eta_{rel}$ (relative viscosity) is the ratio between flow time of the polymer solution and flow time of the solvent, alone, as measured at 30° C. in a capillary viscometer. The inherent viscosity values which are reported and specified herein are based on use of concentrated sulfuric acid (96% $H_2SO_4$) as the solvent.

Sulfur Content

A yarn sample of small quantity (about 0.5 gram) is dissolved in about 96% sulfuric acid, and water is then added to precipitate the polymer. Water is continuously added thereafter, to thoroughly wash the polymer to remove any free sulfate, such as sodium sulfate, from the polymer. The resulting polymer sample is dried and carefully weighed before being placed in a Schoniger flask for combustion with pure oxygen. $SO_2$ and $SO_3$ generated by the combustion are absorbed in water to form sulfuric acid. The acid is titrated using barium chloride to determine the sulfur content, as bound sulfonic acid or sulfonate groups, on the original yarn sample. Sulfur is reported as tools of sulfur, in the form of sulfonate groups, per 100 mols of PPD-T repeat units.

Flame Strength Test

The end of a dried yarn sample is attached to a stationary beam, extended horizontally over another stationary beam, and held taut with a weight. A flame is held beneath a horizontal portion of the yarn and the time for the yarn to burn through and the weight to fall is recorded. In tests reported herein, the flame temperature was about 700C. Because there may be significant variation in test conditions, the tests reported herein are usually conducted simultaneously on a yarn of the invention and, as a control, on the same yarn without the metal. Flame strength is reported as a ratio of the times required for the test yarn and the control yarn to break using equal weight; or, alternatively, the weights on the yarns can be adjusted to yield nearly equal flame exposure times before breaking and, in that case, the flame strength will be reported as the ratio of the weights on the test yarn and on the control yarn.

Metal Content

Metal content is determined by inductive coupled plasma-atomic emission spectroscopy as described in ASTM-C 1111-88.

DESCRIPTION OF PREFERRED EMBODIMENTS

The following examples are illustrative of the invention and are not to be construed as limiting.

EXAMPLE 1

In this example, tungsten-treated fibers were made and tested for flame strength.

Four different poly(p-phenylene terephthalamide) (PPD-T) spinning solutions were prepared in 100.1 percent sulfuric acid:

1. A solution of 19.4 weight percent PPD-T was made using PPD-T which had an inherent viscosity of 6.37 dL/g and 0.7 tools of sulfur per 100 mols of PPD-T repeat units.
2. A solution of 10 weight percent PPD-T was made using PPD-T which had an inherent viscosity of 3.40 dL/g and essentially zero mols of sulfur per 100 mols of PPD-T repeat units.
3. A solution of 19.4 weight percent PPD-T was made using PPD-T which had an inherent viscosity of 5.17 dL/g and 6.0 moles of sulfur per 100 moles of PPD-T repeat units.
4. A solution of 10 weight percent PPD-T was made using PPD-T which had an inherent viscosity of 1.97 dL/g and 6.9 mols of sulfur per 100 mols of PPD-T repeat units.

The four PPD-T spinning solutions were spun in accordance with the procedure set out in U.S. Pat. No. 3,767,756.

Portions of each of the spun PPD-T fibers, in never-dried form, were contacted for 5 seconds with a phosphotungstic acid solution and were then thoroughly washed. The phosphotungstic acid solution was made by adding 247.5 weight parts sodium tungstate and 23.75 weight parts disodium phosphate to 500 weight parts water; adjusting the pH to 1.1 with sulfuric acid; and heating to a boil whereupon the solution cleared with a pH of about 2.6. Equivalent portions of each of the spun PPD-T yarns were not contacted with the tungstic acid solution and were used herein as control fibers.

The tungsten-treated fibers and the control fibers were dried overnight in a vacuum oven at 80° C. and were then subjected, in triplicate, to the Flame Strength test determining times to break at constant weights and reporting the ratio of the time for treated fibers and the time for control fibers. Results of the Flame Strength test, as an average of the triplicate values, are as follow:

| Spinning Soln. No. | Burn-Through (sec.) | Weight Used(g) | Flame Strength | Tungsten Content (weight %) |
| --- | --- | --- | --- | --- |
| 1. treated | 8.5 | 20 | 1 | <0.1 |
| 1. control | 8.5 | 20 | | |
| 2. treated | 9.0 | 20 | 1 | <0.1 |
| 2. control | 9.0 | 20 | | |
| 3. treated | 8.4 | 20 | 1 | <0.1 |
| 3. control | 8.4 | 20 | | |
| 4. treated | 12.0 | 100 | 5 | 7.21 |
| 4. control | 7.2 | 20 | | |

It should be noted that only the treated fibers made from spinning solution number 4 are the fibers of this invention made in this Example. For reasons not entirely understood, fibers made from the other spinning solutions were not improved by the tungsten treatment. The PPD-T in spinning solutions number 1 and 3 have an inherent viscosity above 4 dL/g—apparently too high to permit adequate imbibition of the treatment metal. The PPD-T in spinning solutions number 1 and 2 have sulfonation less than 5 mols per 100 mols of PPD-T repeat units—apparently too low to attract or retain the treatment metal. The PPD-T in spinning solution number 1 has, both, inherent viscosity which is too high and sulfonation which is too low.

EXAMPLE 2

Fibers made using spinning solution number 4 from Example 1 were treated, by contact for 5 seconds, with a phosphomolybdic acid solution. The phosphomolybdic acid solution was made by adding 49.5 weight parts sodium molybdate and 4.75 weight parts disodium phosphate to 100 weight parts water; adjusting the pH to 2.5 with sulfuric acid; and heating to a boil whereupon the solution clears.

The molybdenum-treated fibers and corresponding untreated control fibers were dried overnight in a vacuum oven at 80° C. and were then subjected, in triplicate, to the Flame Strength test adjusting weights on the yarns to yield nearly equal exposure times to break and reporting the ratio of the breaking weight for the treated fibers and the breaking weight for the control fibers. Results of the Flame Strength test, as an average of the triplicate values, are as follow:

| Articles | Flame Exposure (sec.) | Weight Used(g) | Flame Strength | Molybdenum Content (weight %) |
| --- | --- | --- | --- | --- |
| treated | 8 | 150 | 15 | 6.3 |
| control | 8 | 10 | | None detected |

EXAMPLE 3

Fibers spun from solution number 4 were treated, by contact for 5 seconds, with a vanadium solution, in one instance, and with a palladium solution in another instance. The vanadium solution was made by, first, adding 49.5 weight parts sodium vanadate and 4.75 weight parts disodium phosphate to 100 weight parts water and adjusting the pH to 3 with sulfuric acid, and then combining 18 weight parts of that solution with 45 weight parts acetic acid and 37 weight parts water. The palladium solution was made by adding 1.4 weight parts palladium chloride and 12 weight parts citric acid to 100 weight parts water, and heating to a clear solution.

Improvement in Flame Strength exhibited by fibers treated with vanadium was about 2× and with palladium was, also, about 2×.

EXAMPLE 4

In this example, aramid fibers as spun from solution number 4 in Example 1 were treated by contact with tungsten solutions of different concentrations in accordance with the present invention and the fibers were then tested for Flame Strength.

The tungsten solutions were made by diluting a master solution, in amounts listed in the Table, to a total volume of 50 milliliters with water. The master solution was 49.5 grams of sodium tungstate, and 4.75 grams of sodium phosphate in 100 milliliters of water adjusted to a pH of 2.0 with sulfuric acid. The master solution was stirred for thirty minutes at 80° C. before the solutions were made.

A sample of never-dried fibers was immersed for five seconds in each tungsten solution and was then immediately rinsed with water and dried. The tungsten content in the fibers was determined and the Flame Strengths were determined. In this example, the Flame Strength was established to show the improvement in flame strength of the fibers of this invention as compared with the same fibers having no tungsten.

To determine the Flame Strength, a test yarn and a control yarn were simultaneously subjected to the flame of the Flame Strength Test in which the control yarn was weighted with 10 grams and, by trial and error, the weight of the test yarn was adjusted such that both yarns burned through within 3 seconds of each other. The yarns generally burned through in 7 to 10 seconds. This Flame Strength is the ratio of the weight on the test yarn to the weight on the control yarn. In this test, a tungsten concentration of about 1 weight percent in the fibers resulted in a Flame Strength of about 5.

TABLE

| Item | Master Soln.(ml) | Tungsten Solution (%) | Tungsten Fiber (%) | Flame Strength |
|---|---|---|---|---|
| A | 4 | 5.96 | 10.1 | 20 |
| B | 30 | 4.81 | 8.36 | 22 |
| C | 20 | 3.69 | 7.31 | 22 |
| D | 10 | 2.55 | 4.80 | 25 |
| E | 7 | 1.24 | 3.18 | 25 |
| F | 5 | 0.94 | 3.69 | 20 |
| G | 3 | 0.67 | 2.34 | 12 |
| H | 2 | 0.41 | 1.75 | 10 |
| I | 1 | 0.14 | 0.58 | 4 |
| J | 0.5 | 0.07 | 0.31 | 1 |

We claim:

1. A high flame strength article of poly(p-phenylene terephthalamide) polymer having:

(i) an inherent viscosity of 1.5 to 4 dL/g;

(ii) 5 to 20 reels of sulfur, as sulfonate groups, per 100 mols of polymer repeat units; and (iii) at least 0.5 weight percent, based on total weight of the article, of a metal wherein the metal is present as oxides selected from the group consisting of tungsten oxides and molybdenum oxides, uniformly distributed throughout the poly(p-phenylene terephthalamide) polymer.

2. The article of claim 1 wherein the metal is tungsten.

3. The article of claim 1 wherein the metal is molybdenum.

4. The article of claim 1 as a fiber wherein the flame strength of the article is at least five times greater than the flame strength of a fiber made by substantially the same process using substantially the same materials in the absence of the metal.

5. The article of claim 1 wherein the metal is present in the amount of 1.0 to 15 weight percent.

6. The article of claim 1 in the form of a fiber.

* * * * *